United States Patent
Catalano et al.

(10) Patent No.: US 10,269,166 B2
(45) Date of Patent: Apr. 23, 2019

(54) METHOD AND A PRODUCTION RENDERER FOR ACCELERATING IMAGE RENDERING

(71) Applicant: Nvidia Corporation, Santa Clara, CA (US)

(72) Inventors: Enzo Catalano, Berlin (DE); Rajko Yasui-Schoeffel, Berlin (DE); Ken Dahm, Berlin (DE); Nikolaus Binder, Berlin (DE); Alexander Keller, Berlin (DE)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 15/434,874

(22) Filed: Feb. 16, 2017

(65) Prior Publication Data
US 2017/0236322 A1    Aug. 17, 2017

Related U.S. Application Data

(60) Provisional application No. 62/295,868, filed on Feb. 16, 2016.

(51) Int. Cl.
*G06T 15/00* (2011.01)
*G06T 15/06* (2011.01)

(52) U.S. Cl.
CPC ............ *G06T 15/005* (2013.01); *G06T 15/06* (2013.01)

(58) Field of Classification Search
CPC ...................................................... G06T 1/20
See application file for complete search history.

(56) References Cited

U.S. PATENT DOCUMENTS

| | | | |
|---|---|---|---|
| 2002/0166000 A1* | 11/2002 | Rossi | G06F 8/38 719/328 |
| 2012/0223947 A1* | 9/2012 | Nystad | G06T 15/005 345/426 |
| 2013/0021445 A1* | 1/2013 | Cossette-Pacheco | G06T 15/40 348/46 |
| 2013/0063464 A1* | 3/2013 | Schneider | G09G 5/00 345/582 |
| 2014/0218377 A1* | 8/2014 | Wu | G06T 1/20 345/504 |
| 2014/0292774 A1* | 10/2014 | Radig | G06T 1/20 345/505 |
| 2015/0074350 A1* | 3/2015 | Chiang | G06F 12/0808 711/118 |

(Continued)

OTHER PUBLICATIONS

Debattista, K., et al., "Accelerating the Irradiance Cache through Parallel Component-Based Rendering," Eurographics Symposium on Parallel Graphics and Visualization, 2006, 9 pages.

(Continued)

*Primary Examiner* — Phi Hoang
(74) *Attorney, Agent, or Firm* — Kevin Brown; Parker Justiss, P.C.

(57) ABSTRACT

A method, a computer program, and a production renderer for accelerating a rendering process of an image are provided. In one embodiment, the method includes intercepting a first invocation of a function from a custom shader during a rendering process of an image, computing a result of the function employing a processor, and returning the result to the custom shader in response to a second invocation of the function during the rendering process.

27 Claims, 3 Drawing Sheets

(56) References Cited

U.S. PATENT DOCUMENTS

| | | | | |
|---|---|---|---|---|
| 2015/0371410 A1* | 12/2015 | Hwang | ............... | G06T 11/00 |
| | | | | 345/582 |
| 2016/0133230 A1* | 5/2016 | Daniels | ............ | G06T 19/006 |
| | | | | 345/633 |
| 2016/0378568 A1* | 12/2016 | Knox | ............... | G06F 9/5083 |
| | | | | 718/105 |
| 2017/0255471 A1* | 9/2017 | Smith | ............... | G06F 9/3867 |

OTHER PUBLICATIONS

Krivanek, J., et al., "Practical Global Illumination with Irradiance Caching," Synthesis lectures in computer graphics and animation, 148 pages.

Parker, S. G., et al., "OptiX: A General Purpose Ray Tracing Engine," ACM Transactions on Graphics (TOG)—Proceedings of ACM SIGGRAPH 2010 TOG 29, Article No. 66, 13 pages.

Keller, A., "Quasi-Monte Carlo Image Synthesis in a Nutshell," in Monte Carlo and Quasi-Monte Carlo Methods, 2012, 38 pages.

* cited by examiner

METHOD AND A PRODUCTION RENDERER FOR ACCELERATING IMAGE RENDERING

CROSS-REFERENCE TO RELATED APPLICATION

This application claims the benefit of U.S. Provisional Application Ser. No. 62/295,868, filed by Enzo Catalano et al. on Feb. 16, 2016, entitled "GI NEXT," commonly assigned with this application and incorporated herein by reference.

TECHNICAL FIELD

The present disclosure relates to computer graphics, and more particularly to rendering images.

BACKGROUND

Synthesizing images using a production renderer in film and game production is a popular technique. A production renderer can deliver photorealistic images by taking into account various physical entities like cameras, lights, and materials on top of a surface of a scene. However, current techniques for using a production renderer are associated with various limitations, namely, depending on the complexity of a model, the time for it to render an image. There is thus a need for addressing this and/or other limitations of the current techniques.

SUMMARY

Embodiments of the present disclosure provide a method, a computer program product, and a production renderer for accelerating a rendering process of an image.

In one embodiment, the method includes intercepting a first invocation of a function from a custom shader during a rendering process of an image, computing a result of the function employing a processor, and returning the result to the custom shader in response to a second invocation of the function during the rendering process.

In another embodiment, the computer program product is stored on a non-transitory computer readable medium, that when executed, causes a processor to receive a first invocation of a function from a custom shader during a rendering process of an image, compute a result of the function, and return the result of the function to the custom shader in response to a second invocation of the function during the rendering process.

In yet another embodiment, the production renderer includes an accelerator configured to accelerate a rendering process of an image, and a processor configured to receive a first invocation of a function from a custom shader during the rendering process of the image, forward the function to the accelerator, and return a result of the function to the custom shader in response to a second invocation of the function during the rendering process. The accelerator is further configured to compute the result of the function when the function is forwarded to the accelerator.

BRIEF DESCRIPTION

Reference is now made to the following descriptions taken in conjunction with the accompanying drawings, in which.

DETAILED DESCRIPTION

The sheer size of texture data and the complexity of custom shaders in production rendering have been the two major challenges in the way of accelerating the rendering time of production renderers. Previous attempts to overcome these challenges have been porting an entire production renderer from a rendering core to an accelerator, e.g., a Graphics Processing Unit (GPU), rewriting the custom shaders for the accelerator, and replacing custom shaders with equivalent shaders on the accelerator.

These attempts, however, have proven to be very complex and time-consuming because they often require rewriting most of the render algorithms and custom shaders. In some instances, it is impossible to rewrite the custom shaders because source codes of the custom shaders are not accessible (if they are private to a customer, e.g., black box shaders). Besides, even if the production renderer is ported to the accelerator, it still had to deal with the amount of memory available on the accelerator for the texture data separately.

Introduced herein are a method, apparatus and a computer program product that accelerate the rendering process of an image by executing one or more of time-consuming processes of the rendering core on an accelerator using approximate shading. As such, the primary shading is still done on the rendering core of the production renderer as before and thus important rendering features, like for example Depth-of-Field, Motion Blur, multiple Reflections and Refractions, would continue to work as before.

The introduced rendering acceleration is based on the recognition that custom shaders call or invoke functions of the rendering core and these calls or invocations may include procedures that are very time consuming when executed in the rendering core, e.g., executed independently of the shader code. For example, rendering core functions for determining the irradiance for global illumination (GI), looking up values for Image Based Lighting lookup (IBL), casting shadow rays and determining occlusion or ambient occlusion or obscurance, or executing a light loop for illumination computations, can be costly when executed on the rendering core. As such, by intercepting such function calls, recording their parameters, and executing the requests in large batches on an accelerator, for example a GPU, the rendering process may be accelerated without the need of modifying the shader code or its binaries. In fact, as the introduced method, apparatus and product do not require any modification of the custom shader's source code, they can be incorporated into any renderer with only minimal modifications and extensions. Moreover, as the computations of the intercepted function calls are carried out employing the approximate shading, which uses shader information deduced from the custom shader, the acceleration may take place outside the source code of the custom shader.

One embodiment of the disclosure performs the rendering process in three phases:
1. The rendering process is invoked on the rendering core as usual. Instead of executing rendering core function calls from custom shaders as usual, the function calls are recorded and dummy values are returned to the custom shaders instead of expensively computing the actual results.
2. The recorded function calls are executed in an accelerated way. For best acceleration, the function calls are computed in batches on a processor such as a GPU.
3. The rendering process is invoked again on the rendering core, with an initial state identical to the first invocation in step 1. Instead of recording the function calls and returning dummy values, now the results computed in the acceleration step 2 are returned.

The acceleration of the rendering core computations in step 2 may amortize the cost of the double invocation of the rendering process. The acceleration may be switched on manually, e.g., in response to statistics, or automatically by means of testing for the existence of an accelerator upon the invocation of the rendering process.

Figure 1:
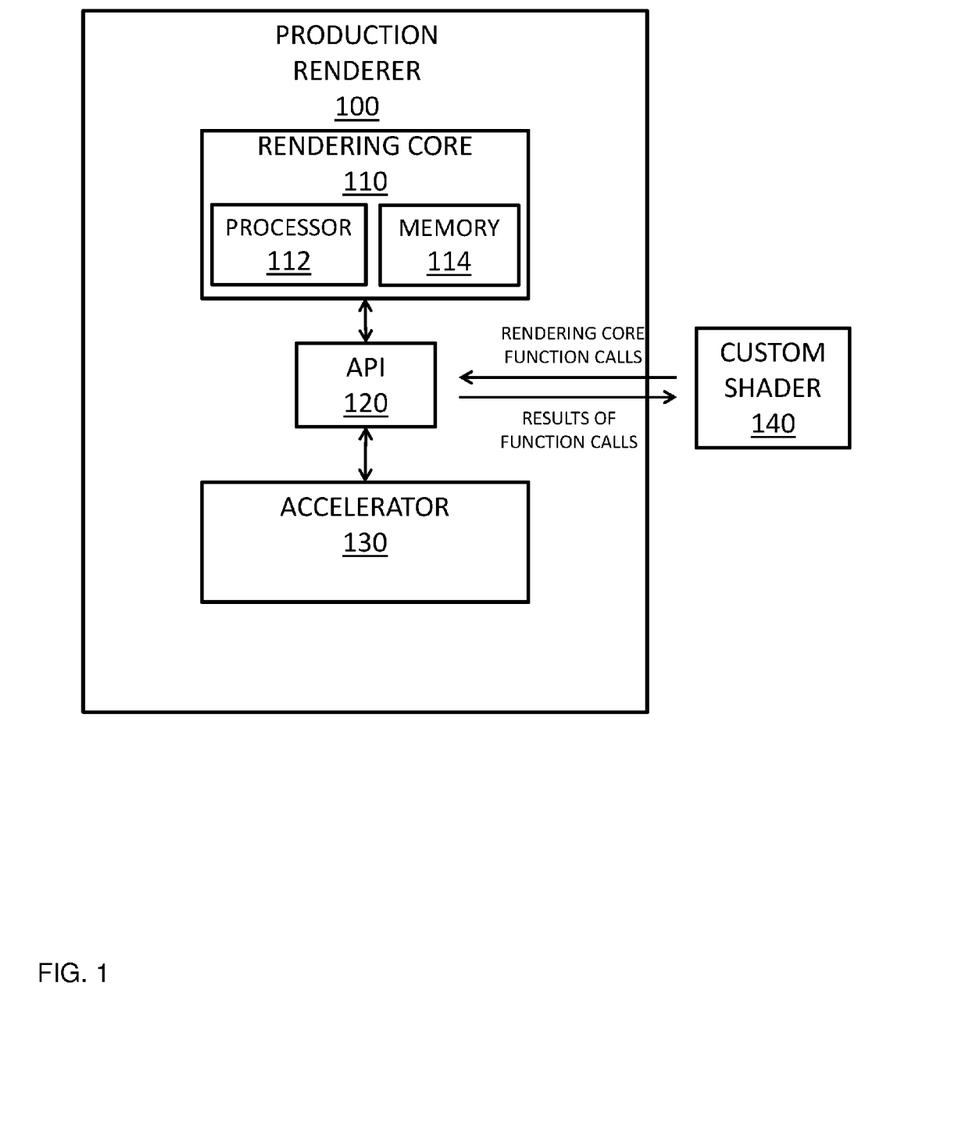
FIG. 1 illustrates a block diagram of an example of a production renderer constructed according to the principles of the disclosure.

FIG. 1 illustrates a block diagram of an example of a production renderer 100 and a custom shader 140. In the illustrated embodiment, the production renderer 100 includes a rendering core 110, an application programming interface (API) 120 and an accelerator 130. In one embodiment, the production renderer 100 is a mental ray® production renderer from NVIDIA Corporation of Santa Clara, Calif.

The rendering core 110 and the API 120 are configured to integrate the custom shaders 140 to define materials, lights, environments, camera, and other effects in rendering an image. The custom shader 140 is called in the rendering process at appropriate times by the rendering core 110 and has access to a rendering state and the rendering core functions. In the current disclosure, "custom shader" refers to a black box shader, whose source code is only available to the writers of the source and the intended beneficiary, e.g., a customer, of the custom shader. As such, details about a custom shader may only be inferred by calling it with a state provided by the rendering core and drawing conclusions from the values returned by the custom shader—an inspection other than that may not be feasible.

In the illustrated embodiment, the rendering core 110 includes a processor 112 and a memory 114. In one embodiment, the processor 112 is a CPU having one or more processing cores, e.g., CPU cores. The processor 112 is configured to prepare and facilitate the rendering process of an image.

Before the rendering process begins, the processor 112 may generate and export a scene geometry and a point cloud to the accelerator 130. Once the rendering process starts, the processor 112 can record and forward a particular rendering core function call generated by the custom shader 140 to the accelerator 130 for computing the result of the function call. The core function call may be recorded by storing the current rendering state information, e.g., query point, needed for computing the invoked function. When the custom shader 140 calls the particular rendering core function again, e.g., when the rendering process restarts, the processor 112 may return the accelerator-computed result to the custom shader 140 for the computation of the correct final render result.

The memory 114 may be a conventional memory that is constructed to store data. In the illustrated embodiment, the memory 114 is configured to store the scene geometry and point cloud generated by the processor 112 of the rendering core 110. Each point of the point cloud may include data about the scene geometry, its surface properties, shading properties, for example shader information deduced from the custom shader 140, and illumination information. Querying the point cloud thus provides data for each point in the scene that are needed in computing rendering core function calls. It is noted that shading parameters, texturing, and lighting information may be embedded in the point cloud.

In one embodiment, the memory 114 is shared between the rendering core 110 and the accelerator 130. In such an embodiment, there is no need to share data between them before the rendering process. The memory 114 or at least a portion thereof may be a non-volatile memory and included as a part of the processor 112.

The API 120 is configured to facilitate the communication between the rendering core 110, the accelerator 130 and the custom shader 140. For example, the API 120 may transfer the scene geometry and the point cloud data from the memory 114 of the rendering core 110 to the accelerator before the rendering process and deliver the rendering function call from the custom shader 140 to the accelerator 130 and the computed results from the accelerator 130 to the rendering core 110. In one embodiment, where the memory 114 is shared between the rendering core 110 and the accelerator 130, there is no need to share transfer/export data between them.

In the illustrated embodiment, the accelerator 130 is configured to compute the result of the forwarded rendering core function calls. The accelerator 130 can compute the rendering function calls in an accelerated manner using a generic shader model and the data from the point cloud. This is called approximate shading and described in more details below (see FIG. 3). The accelerator 130 can also compute the rendering core function calls in batches for efficiency. In one embodiment, the accelerator 130 is a GPU. In another embodiment, the accelerator 130 is a reconfigurable/programmable accelerator.

In one embodiment, the production renderer 100 may not include the accelerator 130. In such an embodiment, the processor 112 of the rendering core 110 may be configured to compute the result of the rendering core functions calls from the custom shader 140 using the approximate shading. Although the acceleration factor of this embodiment may not be as dramatic as the above embodiment having an accelerator (20 to 60 times faster on the average than a non-accelerated embodiment), it still reduces the rendering process time by more than half.

Figure 2:
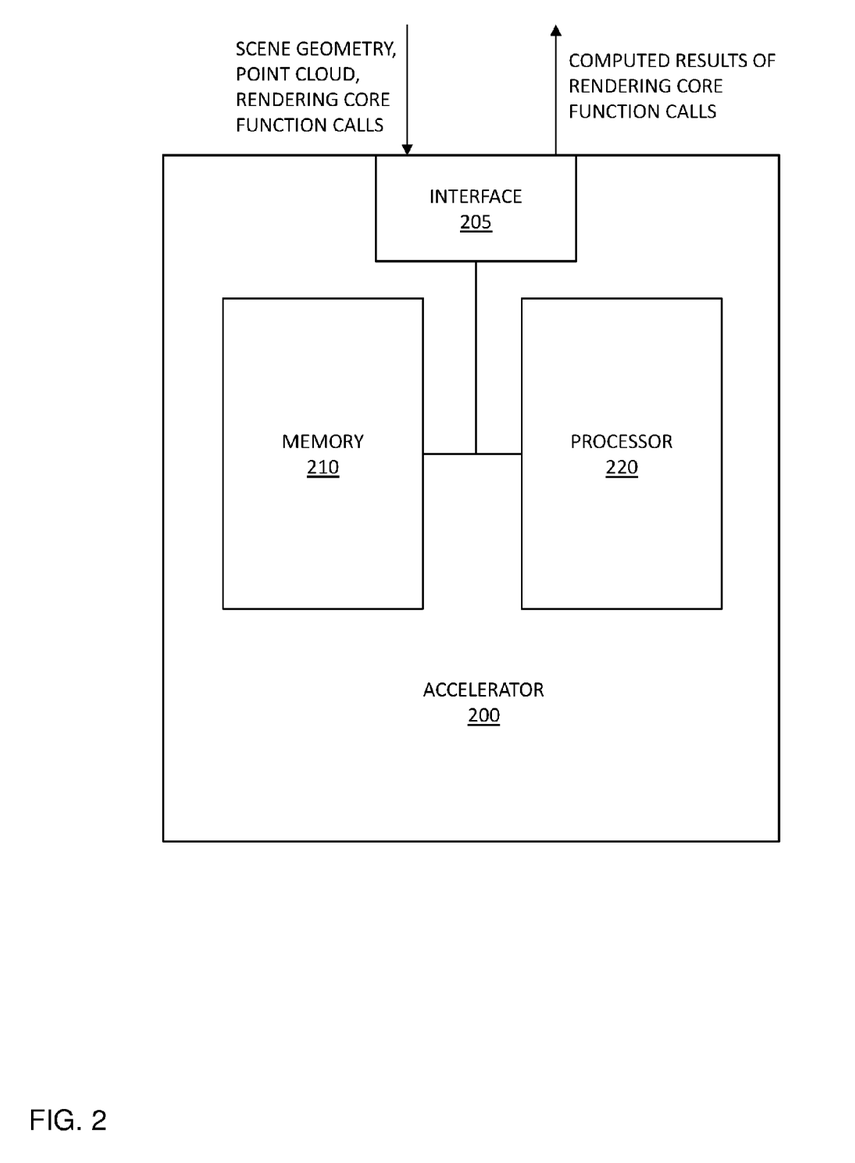
FIG. 2 illustrates a block diagram of an example of an accelerator constructed according to the principles of the disclosure.

FIG. 2 illustrates a block diagram of an example of an accelerator 200. The accelerator 200 may be provided as a part of a production renderer, such as the accelerator 130 illustrated in FIG. 1. In one embodiment, the accelerator 200 is a GPU. In another embodiment, the accelerator 200 is a reconfigurable/programmable accelerator. In the illustrated embodiment, the accelerator 200 includes an interface 205, a memory 210 and a processor 220. The interface 205, the memory 210 and the processor 220 may be connected together via conventional means.

The interface 205 is configured to communicate data with an API, such as the API 120 of FIG. 1, that is coupled between a rendering core and a custom shader. The interface 205 may receive data, e.g., a scene geometry and a point cloud from the rendering core, and rendering core function calls and return the computation results, e.g., results of the invoked rendering core functions, to the rendering core. In one embodiment, the interface 205 may be a part of a production renderer.

The memory 210 may be a conventional memory that is constructed to store data. The memory 210 may store operating instructions to direct the operation of the processor 220 when initiated thereby. The operating instructions may correspond to algorithms that provide the rendering acceleration functionality disclosed herein, such as the method of FIG. 3.

In the illustrated embodiment, the memory 210 is configured to store the scene geometry and point cloud exported from a rendering core. As mentioned above, the point cloud may include presampled scene and custom shader data, e.g., shader information deduced from a custom shader, that are needed in executing rendering core function invoked by the custom shader. The memory 210 or at least a portion thereof may be a non-volatile memory.

The processor 220 is configured to compute results of the rendering core function calls forwarded to the processor 220. The processor 220 can compute the forwarded functions calls using the approximate shading. In one embodiment, the processor 220 may compute the rendering core function calls in at least one batch since accelerating each rendering core function call individually may not be economical. In an embodiment where the rendering core has multiple processors, each processor's batch may be merged together in a larger batch for even more efficient processing.

In some embodiments, the approximate shading only requires the point cloud data to feed the approximate shader. As such, the processor 220 can execute the computations without accessing the source code of the custom shader. In some embodiments, the processor 220 may also take advantage of a fast ray tracing engine available on the accelerator 200, such as OptiX™ from NVIDIA Corporation. Moreover, as all the data needed for the computations are gathered upfront (in the point cloud data), storage and access to potentially large textures as used by custom shaders is not necessary. The computation by the processor 220 may be independent of the number of light sources used in the sampling and capturing process because the lighting information may be contained in the point cloud as well.

Figure 3:
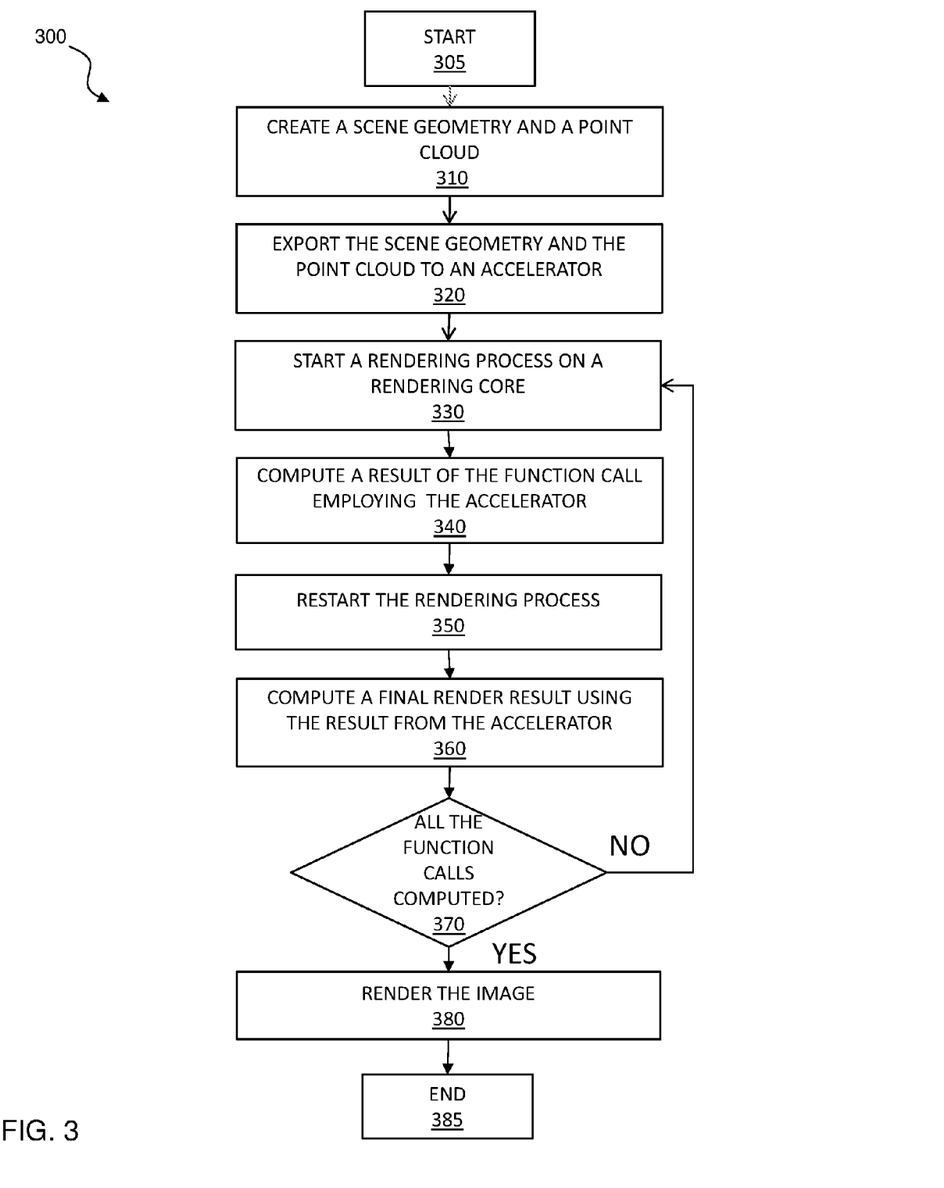
FIG. 3 illustrates a flow diagram of an example of a method for accelerating a rendering process of an image using a production renderer according to the principles of the disclosure.

FIG. 3 illustrates a flow diagram of an example of a method 300 for accelerating a rendering process of an image carried out according to the principles of the disclosure. The method 300 may be performed by a production renderer, such as the production renderer 100 of FIG. 1. In one embodiment, the method 300 may be used to compute illumination in an image used in games, e.g., real-time games, and films. The method begins in step 305.

In step 310, geometry data of an image, e.g. a scene geometry, and a point cloud are created. The point cloud is created by placing points on surfaces of the scene geometry, and sampling properties at each point.

In one embodiment, the placement process of the points is organized in passes, where each pass refines the result of the previous pass by adaptively adding new points. As such, in locations where high detail is required, higher point density is achieved. Such high detail locations could be sharp gradients in direct light contribution, abrupt color changes from shading, or varying normal indicating geometric detail. Other placement processes includes uniformly sampling the surface of the scene, selecting sampling points on demand, tracing light transport paths from the camera to create points of interest, and sampling points in the volume of the scene.

The sampled properties of each point include surface properties, direct light contribution from all light sources and shader information. The shader information represents shader characteristics of a custom shader, such as the custom shader 140 of FIG. 1, whose source code may not readily be available. As such, the shader information at each point is extracted by setting special render states before calling the shader, and deducing shader internals from the shader result.

In one embodiment, given a point to shade, a state indicating that lights and environment lighting shall be disabled, and reflection and refraction rays shall not be traced is provided to a custom shader. If the custom shader calls the rendering core function, such as mi_compute_irradiance( ), the rendering core provides the normalized color white on the front facing side and black on the backside of the surface point under consideration instead of the irradiance. Calling the custom shader then returns a color that is the diffuse albedo plus the ambient illumination/emission in the given point. Calling the custom shader a second time with the same setting, except for returning just black on a call to mi_compute_irradiance( ) results in the ambient illumination/emission term, which may be subtracted from the previous result, yielding the diffuse albedo. In a similar way, more shader information such as reflection, refraction, and transmission properties are extracted. Even the index of refraction and the attenuation of the irradiance may be extracted this way. It is noted that the deduced shader information includes the evaluation of texture and procedural texture values for the point of consideration. The shader information is stored with the points in the point cloud. For example, the diffuse color may be stored as P.diffuse_color in the point P, while P.incoming_direct_light represents the incoming direct light to the point P.

In one embodiment, using the point cloud may involve compressing the point cloud data, which may increase performance, especially on an accelerator. For example, colors in the RGB format may be compressed from three floating point values to 32 bits, where 8 bits each are used for a mantissa and 8 bits are used for a shared exponent. Similarly, positions may be compressed by encoding them at reduced precision relative to bounding boxes.

Once the scene geometry and the point cloud are created, they are exported to an accelerator, such as the accelerator 130 or 200 in FIGS. 1 and 2, in step 320. This may happen asynchronously during a memory transfer between the rendering core and the accelerator. In an embodiment where the rendering core and the accelerator share one memory, this step may be omitted. It is noted that neither textures nor light sources need to be exported because this information is already embedded in the point cloud.

In step 330, a rendering core starts the rendering process of the image. The rendering core can be that of a production renderer. The rendering core initializes the render state, e.g., using a quasi-Monte Carlo rendering method, and performs the rendering process, including core operations (e.g., ray tracing) and custom shader calls at each shading/hit point (e.g., ray-surface intersections).

When a custom shader is called by the rendering core, it gains an access to a rendering state and an API to call (or otherwise invoke) certain rendering core functions. For example, the custom shader may call the rendering core function mi_compute_irradiance( ) to request the calculation of the irradiance at the current shading point. In one embodiment, rendering core functions are written in C/C++.

Additionally in step 330, this rendering core function call is intercepted and forwarded to an accelerator for execution. In the current disclosure, the rendering function call is considered "intercepted" as it is originally intended for the rendering core. In one embodiment, the interception and forwarding is facilitated using an API of the rendering core. In the step 330, the function call is recorded by storing current rendering state information needed to compute the invoked rendering core function. In one embodiment, the stored information includes a 3D position, the geometry and shading normal and the current quasi-Monte Carlo sampling state. The information may be called "query point".

Also in the step 330, the rendering core returns dummy values to the custom shader. This prevents the custom shader from optimizing for special cases, e.g., zero irradiance. Returning dummy values makes the custom shader's rendering results useless, which in turn are discarded.

In step 340, the accelerator computes the results of the forwarded rendering core function for each Query Point using the approximate shading. The accelerator can use the scene geometry and the data in the point cloud, such as direct lighting contribution and the shader information for the computation.

For the approximate shading, instead of executing the custom shaders in the hit points, the accelerator employs a single generic approximate shader, e.g., a generic BRDF model in case of irradiance calculation, that is fed with the data of the pre-sampled points that are closest to the hit points. Finding the closest point may include checking the similarity of the normals of the hit point and the points in the point cloud. Employing a single generic approximate shader minimizes execution divergence on the accelerator, while being able to benefit from the superior ray tracing performance on the accelerator. Furthermore, it saves on costly custom shader execution and there is no need to access large texture data and there is no need to run potentially costly light loops to compute direct illumination.

To further illustrate the principle of the approximate shading, the diffuse contribution to the irradiance is considered. At each hit point, the result of the computation of the approximate shader is:

$$result = P.\text{diffuse\_color} * (P.\text{incoming\_direct\_light} + \pi \cdot \text{diffuse\_ray})$$

where P is the closest pre-sampled point and diffuse_ray is the result of tracing another diffuse ray into the scene (in case the ray misses the geometry, the environment contribution along the ray direction is taken instead). The full implementation of the approximate shader takes into account the other components like reflections and refractions, along with diffuse transmission as well (possibly tracing additional rays).

It is noted that contrary to irradiance interpolation, irradiance is computed as a spherical integral weighted by a cosine, which acts as a smoothing operator. The piecewise constant approximation of the integrand thus further helps reducing the variance. Even though shader information is only approximated by the point cloud values and density of points, the computed irradiance contains geometry effects in full detail, like occlusion or color bleeding.

As mentioned before, the query points are collected and merged into batches so that they can be computed more efficiently by the accelerator. When complete, the computed result is sent back to the rendering core. The computed result may be referenced by numbering the function call so that it may be easily found later.

In step 350, the rendering process is started again using the same render state used in the step 330. This usage of the same render state makes the rendering process deterministic and exactly repeatable, such that the same custom shader and core rendering function that were called earlier are called again at the exact same shading points, even across heterogeneous parallel computing environments. In one embodiment, the rendering process uses a quasi-Monte Carlo rendering method as used in Tray® and mental ray® from NVIDIA Corporation. This deterministic method makes the rendering process exactly repeatable and allows for efficient parallelization.

This time, instead of intercepting and forwarding the rendering core function call, the rendering core returns the computed results from the step 340 to the custom shader. The custom shader uses the computed results to compute the final render result in step 360.

It is noted that the achieved acceleration easily compensates the double invocation of the rendering process. For example, using a GPU accelerated version of a production renderer, e.g., mental ray® from NVIDIA Corporation, the total rendering process runs, on the average, 20 to 60 times faster than the non-accelerated process.

In step 370, it is determined whether all the rendering core functions needed to render the image have been computed. If there are more rendering core functions to be computed, the method 300 loops back to the step 330 for further processing. When all the functions are computed, the method 300 proceeds to step 380, in which the final image is rendered. The method 300 ends in step 385.

In one embodiment, a custom shader may be used to shade rays that hit the environment according to their ray direction. When normalized, ray directions may be considered points on the unit sphere and a point cloud may be created thereof storing shader information deduced from the environment shader as before. Points in that point cloud, i.e. points on the unit sphere, may be generated using quasi-Monte Carlo methods and the point cloud may be refined adaptively. Besides their location on the sphere, the points in this point cloud may store an environment color or a high dynamic range color value representing an illumination value. Given a query ray direction, the point on the sphere closest to the query direction or a weighted average of the at least two closest neighbors may be returned as a query result. In order to improve efficiency, the data stored in the point cloud may be replaced by its averaged version. Weights may be chosen according to the angular distance of two directions.

In one embodiment, the method 300 may be augmented using path space filtering. The point cloud created by path space filtering may be processed on an accelerator and results may be provided through rendering core function calls, such as mi_compute_irradiance( ). Augmenting the point cloud created by path space filtering by shader information deduction allows for using one approximate shader to reduce blur across textures. This way, the custom shaders may be handled as black boxes since they do not need to be ported to, for example a GPU, and restricting path space filtering to diffuse transport is no longer required. In another embodiment, the point cloud may be augmented by storing point lights for next event estimation with multiple importance sampling.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Certain embodiments disclosed herein can relate to computer program products stored in a non-transitory computer-readable medium that can cause, when executed, processors such as the processors 112 and 200 of FIGS. 1 and 2, to perform one, multiple or all of the steps of the above-described methods or functions of the system or apparatus described herein.

Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, storage devices, a reconfigurable computing device such as a field programmable array (FPGA), or any type of computing or electronic device.

The above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system or apparatus described herein.

What is claimed is:

1. A method for accelerating a rendering process of an image, comprising:
   accessing, from a custom shader, a first invocation for executing a function during a rendering process of an image, said function to be computed external to said custom shader;
   computing, in a batch and outside of said custom shader, a result of said function employing a processor; and
   returning said result to said custom shader in response to a second invocation of said function during said rendering process, wherein said first invocation and said second invocation have a same initial state.

2. The method of claim 1, wherein the rendering process uses a quasi-Monte Carlo rendering method.

3. The method of claim 1 further comprising recording said first invocation, returning dummy values to said custom shader in response to said first invocation, and said computing is based on said recording of said first invocation.

4. The method of claim 1, wherein said result of said function is computed using shader information that is deduced from said custom shader.

5. The method of claim 4, wherein said shader information is stored in a point cloud.

6. The method of claim 4, wherein said shader information is deduced by setting a special render state for said custom shader and calling said custom shader.

7. The method of claim 1, wherein said processor is at least one of a central processing unit core, a graphics processing unit, or a programmable accelerator.

8. The method as recited in claim 1 wherein said custom shader is one of multiple custom shaders for said rendering process.

9. The method as recited in claim 8 wherein said first invocation is a first request from said custom shaders for executing all rendering core function calls for said rendering process, said method further comprising recording said rendering core function calls and returning dummy values to said custom shaders in response to said rendering core function calls.

10. The method as recited in claim 9 wherein said computing comprises computing, employing said processor, said rendering core function calls based on said recording and in said batch.

11. The method as recited in claim 10 further comprising returning results from said computing to said custom shaders in response to said second invocation, wherein said second invocation is a second request from said custom shaders for executing said rendering core function calls.

12. A computer program product stored on a non-transitory computer readable medium, said computer program product, when executed, causing a processor to:
    receive a first invocation of a function from a custom shader during a rendering process of an image for execution external to said custom shader;
    compute a result of said function external to said custom shader and in a batch; and
    return said result of said function to said custom shader in response to a second invocation of said function during said rendering process, wherein said first invocation and said second invocation have a same initial state.

13. The computer program product of claim 12, further causing said processor to create a scene geometry and a point cloud.

14. The computer program product of claim 13, further causing said processor to export said scene geometry and said point cloud to an accelerator.

15. The computer program product of claim 12, further causing said processor to render an image using said result.

16. The computer program product of claim 12, wherein said result of said function is computed using shader information that is deduced from said custom shader.

17. The computer program product of claim 16, wherein said shader information is deduced by setting a special render state for said custom shader and calling said custom shader.

18. The computer program product of claim 12, wherein said result of said function is computed using an accelerator.

19. A production renderer, comprising:
    a first processor configured to accelerate a rendering process of an image; and
    a second processor configured to:
       receive, from a custom shader, a first invocation for executing a function during said rendering process of said image, said function to be computed external to said custom shader;
       forward said function to said first processor; and
       return a result of said function to said custom shader in response to a second invocation of said function during said rendering process, wherein said first invocation and said second invocation have a same initial state;

wherein said first processor is further configured to compute said result of said function when said function is forwarded to said first processor.

20. The production renderer of claim 19, wherein said result of said function is computed using shader information that is deduced from said custom shader.

21. The production renderer of claim 20, wherein said shader information is deduced by setting a special render state for said custom shader and calling said custom shader.

22. The production renderer of claim 19, wherein said first processor is a Graphics Processing Unit and said second processor is a central processing unit core used by said production renderer.

23. The production renderer of claim 19, wherein said result of said function is computed in a batch.

24. The production renderer of claim 19, wherein said second processor is further configured to return dummy values to said custom shader in response to said first invocation.

25. A method for accelerating a rendering process of an image, comprising:

receiving a first request from custom shaders for executing rendering core function calls for a rendering process of an image;

recording said rendering core function calls and returning dummy values to said custom shaders in response to said rendering core function calls;

computing, in a batch and employing a processor, results of said rendering core function calls based on said recording; and returning results from said computing to said custom shaders in response to receiving a second request from said custom shaders for executing said rendering core function calls for said rendering process, wherein said first request and said second request have a same initial state.

26. The method as recited in claim 25, wherein said processor is at least one of a central processing unit core or a graphics processing unit.

27. The method as recited in claim 25, wherein said processor is a programmable accelerator.

* * * * *